May 27, 1958  C. S. KING  2,836,448
MEANS FOR SECURING A ROTOR ON A SHAFT
Filed May 9, 1955
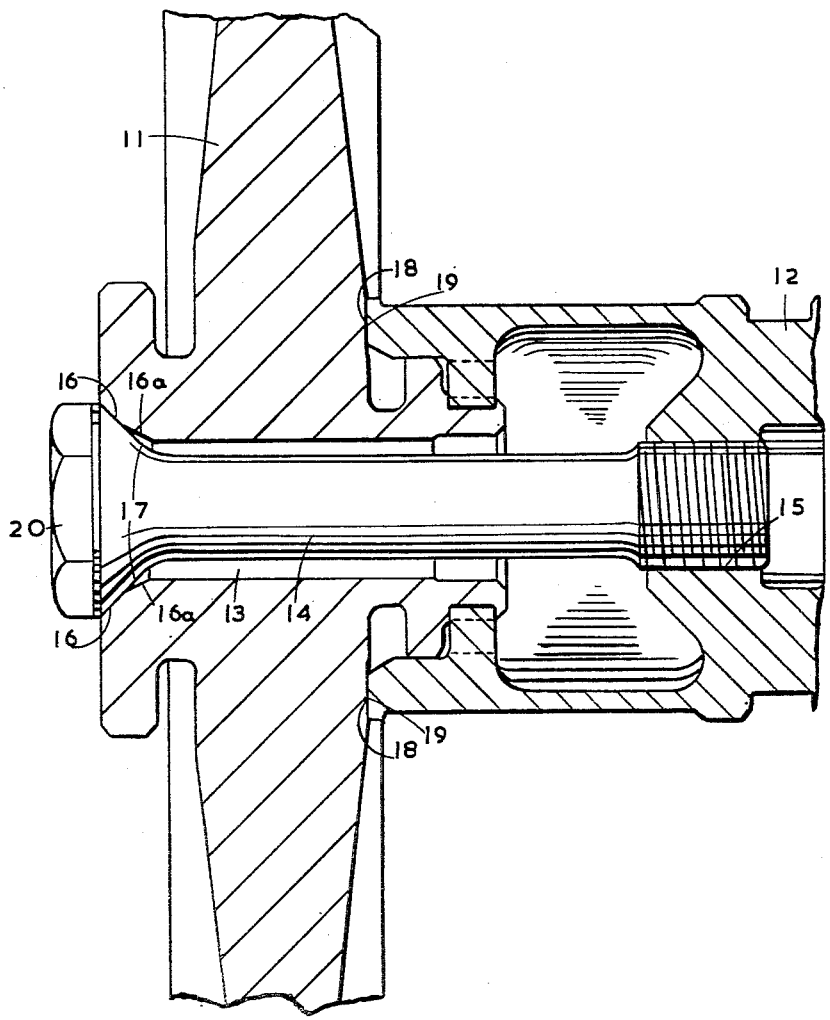
INVENTOR
C. S. KING

United States Patent Office 2,836,448
Patented May 27, 1958

2,836,448

MEANS FOR SECURING A ROTOR ON A SHAFT

Charles S. King, Solihull, England, assignor to The Rover Company Limited, Solihull, England Application May 9, 1955, Serial No. 506,993

Claims priority, application Great Britain May 11, 1954

1 Claim. (Cl. 287—53)

The invention relates to a means for securing, on a shaft, a high-speed rotor of the kind which is subjected to temperature variations in use, such, for example, as the rotor of a compressor, or a turbine, of a gas turbine power plant. Such a rotor is subjected to radial stresses due to centrifugal force, and to radial and axial stresses due to temperature change, and the object of the invention is so to support the rotor from its shaft that the effect of these stresses on the support is in large measure controlled.

According to the invention the rotor is held, with one side abutting an end face of its associated shaft, by a bolt which extends, with radial clearance, through a bore extending coaxially through the rotor and engages in a threaded bore of the shaft, the underside of the head of the bolt being coned at an angle of 90°, the rotor bore having an entrance at the end of the bore remote from said one side of the rotor, the entrance being countersunk to form a first coned surface making an angle of 45° with the axis of the bore, said first coned surface being in contact with the coned part of the bolt head, said entrance being further countersunk to form a second coned surface axially inward of but adjacent the first coned surface, the second coned surface making an angle less than 45°, about 30°, with the axis of the bore, whereby the coned surfaces of the bolt head and rotor bore engage only in the region of their bases and in a non-jamming manner and said portion coned at a lesser angle provides clearance from the remainder of the head of the bolt.

In this way the radial and axial expansion of the rotor due to rising speed and temperature (resulting in the coned mouth of the bore simultaneously distending and moving axially towards the bolt head) will result in the coned mouth of the bore moving along the coned underside of the bolt head in constant engagement therewith.

One construction embodying the invention is shown in the accompanying drawings in which a turbine rotor 11, of a gas turbine power plant, is engaged with a shaft 12 in the manner described in the specification accompanying British application No. 13,680/54.

The rotor 11 has a bore 13 through which extends a bolt 14 engaged in a screw-threaded bore 15 in the shaft 12. The bore 13 has an entrance which is formed with a first coned surface 16 making an angle of 45° with the axis of the bore, and with a second coned surface 16a making an angle of 30° with said axis. The coned end 17 of the underside of the head of the bolt 14 makes an angle of 45° with the axis of the bolt.

The coned surfaces of the bolt head and rotor bore engage only in the region of their bases i. e., the first coned surface 16 engages the outer portion of the coned end 17; and the second coned surface 16a provides clearance from the remainder of the bolt head. The angle of the second coned surface 16a is shown as 60° but this angle is not critical, the essential point being that the angle shall be less than 90° so as to provide adequate clearance from the remainder of the bolt head. One side 18 of the rotor 11 abuts an end face 19 of the shaft 12 and is held thereagainst by the bolt 14.

The bolt head 20 is of non-circular form (e. g., hexagonal) so as to enable it to be turned by an appropriate tool for engaging it in the coaxial, screw-threaded bore 15 of the adjacent end of the shaft 12 for holding the rotor 11 firmly in position.

It will be seen that, by the invention, both radial and axial expansions occurring in the rotor 11 during use can be controlled so as not unduly to stress the bolt 14 holding the rotor 11 in position on the shaft 12, and that such stresses as rise out of these expansions do not act on the rotor 11 in such a way as to move it into an eccentric position relatively to the shaft 12.

What I claim as my invention and desire to secure by Letters Patent of the United States is:

A high-speed gas turbine rotor, a shaft, a bolt, the bolt extending with clearance through a bore extending axially through the rotor and threadedly engaging in a threaded bore in the shaft to hold the rotor on the shaft so that one side of the rotor abuts an end face of the shaft, the bolt having a head and the inner side of the head being coned inwardly of the bolt, the angle of conicity being 90°, the rotor bore having an entrance at the end of the bore remote from said one side of the rotor, the entrance being countersunk to form a first coned surface making an angle of 45° with the axis of the bore, said first coned surface being in contact with the coned part of the bolt head, said entrance being further countersunk to form a second coned surface axially inward of but adjacent the first coned surface, the second coned surface making an angle less than 45°, about 30°, with the axis of the bore to provide clearance from the remainder of the bolt head, whereby the coned surfaces engage only in the region of their bases and in a non-jamming manner.

References Cited in the file of this patent

UNITED STATES PATENTS 663,464     Prince _____ Dec. 11, 1900

FOREIGN PATENTS 694,986     Germany _____ Aug. 13, 1940